US012300951B2

(12) United States Patent
Meng

(10) Patent No.: US 12,300,951 B2
(45) Date of Patent: May 13, 2025

(54) WIRE CLIP ELECTRICAL CONNECTOR

(71) Applicant: Bin Meng, Dongguan (CN)

(72) Inventor: Bin Meng, Dongguan (CN)

( * ) Notice: Subject to any disclaimer, the term of this patent is extended or adjusted under 35 U.S.C. 154(b) by 0 days.

(21) Appl. No.: 16/290,939

(22) Filed: Mar. 3, 2019

(65) Prior Publication Data

US 2024/0275081 A1 Aug. 15, 2024

(51) Int. Cl.
*H01R 4/48* (2006.01)
*H01R 13/426* (2006.01)

(52) U.S. Cl.
CPC ......... *H01R 4/4833* (2023.08); *H01R 4/4821* (2023.08); *H01R 4/489* (2013.01); *H01R 13/426* (2013.01)

(58) Field of Classification Search
CPC .. H01R 4/5008; H01R 13/133; H01R 4/4833; H01R 4/489
See application file for complete search history.

(56) References Cited

U.S. PATENT DOCUMENTS 1,536,688 A * 5/1925 Osborn ................... D06F 75/28 200/51 R
2,075,632 A * 3/1937 Zuckerman .......... H01R 13/193 439/263
3,474,389 A * 10/1969 Hideo ...................... H01R 9/24 403/321
3,517,420 A * 6/1970 Renato ..................... H01R 4/52 403/301
3,643,202 A * 2/1972 Coon ................... H01R 13/193 439/263
4,061,408 A * 12/1977 Bast ........................ H01R 11/24 439/263
4,410,228 A * 10/1983 Stephenson .......... H01R 4/4833 439/817
4,629,274 A * 12/1986 Pollock ................ H01R 4/5075 439/805
4,700,997 A * 10/1987 Strand .................... A61B 5/274 439/372
4,759,726 A * 7/1988 Naylor ................. H01R 4/5008 439/441
4,772,218 A * 9/1988 Ross .................... H01R 4/4821 439/387
4,978,315 A * 12/1990 Edgley ................. H01R 4/4848 439/441

(Continued)

*Primary Examiner* — Neil Abrams
(74) *Attorney, Agent, or Firm* — Global IP Services; Tianhua Gu

(57) ABSTRACT

A wire clip electrical connector, comprising a connector body, an elastic clip piece and an elastic conductive piece disposed in the connector body, and a push rod slidingly matched with the connector body. A wire insertion hole is formed in the connector body, and an elastic clip piece and an elastic conductive piece are located on two sides of the wire insertion hole, and the push rod is provided with a spring piece pressing structure and a stopping structure. According to the above design, the wire is inserted into the wire insertion hole, and the push rod slides relative to the connector body, and the elastic pressing structure on the elastic bar acts on the wire elastic piece, and the wire elastic piece presses the wire on the elastic conductive piece, and the stopping structure restricts the decoupling to achieve a stable connection between the electrical connector and the wire.

11 Claims, 3 Drawing Sheets

(56) References Cited

U.S. PATENT DOCUMENTS

| | | | | | |
|---|---|---|---|---|---|
| 5,275,620 | A * | 1/1994 | Darby | H01R 4/4821 439/441 |
| 5,575,695 | A * | 11/1996 | De Bernardis | H01R 4/4821 439/441 |
| 6,146,187 | A * | 11/2000 | Pallai | H01R 4/4828 439/441 |
| 6,712,649 | B2 * | 3/2004 | Mano | H01R 4/5008 439/441 |
| 8,262,405 | B1 * | 9/2012 | Bishop | H01R 4/4833 439/439 |
| 9,444,155 | B2 * | 9/2016 | Chen | H01R 4/48 |
| 9,559,440 | B2 * | 1/2017 | Wendt | H01R 4/4816 |
| 10,367,289 | B2 * | 7/2019 | Sakaguchi | H01R 13/631 |
| 10,498,050 | B1 * | 12/2019 | Liang | H01R 9/24 |
| 2024/0275081 | A1 * | 8/2024 | Meng | H01R 4/4833 |

* cited by examiner

WIRE CLIP ELECTRICAL CONNECTOR

FIELD OF THE INVENTION

The present invention relates to the field of electronic technology, and in particular to an electrical connector.

BACKGROUND OF THE INVENTION

An electrical connector that is connected to a wire to enable proper operation of an electronic or electrical device. Among them, the wire connected to the electrical connector usually is easily loosened, resulting in poor contact and affecting the operation of the electronic or electrical device.

SUMMARY OF THE INVENTION

The objective of the present invention is to provide a stable connection of an electrical connector with a wire.

In order to achieve the above objective, the present invention provides the following technical solution: a wire clip electrical connector includes a connector body, an elastic clip piece and an elastic conductive piece both disposed in the connector body, and the connector body is provided with a wire insertion hole, the elastic clip piece and an elastic conductive piece are disposed at two sides of the wire insertion hole for clamping a wire inserted into the wire insertion hole. The connector body is fitted with a sliding push rod, and the push rod is provided an elastic clip piece pressing structure, under the action of the elastic clip piece pressing structure, the elastic clip piece presses the wire in the direction of the elastic conductive piece.

According to the above technical solution, a wire is inserted into the wire insertion hole, and the push rod slides forward in relation to the connector body, and the elastic clip piece pressing structure pressing on the elastic clip piece, causing the elastic clip piece to clamp the wire on the elastic conductive piece to allow a stable connection of the wire clip electrical connector with the wire.

As a modification of the above technical solution, the push rod is provided with a first elastic wire stop structure, and the upper part of the first elastic wire stop structure is provided with a second elastic wire stop structure that cooperates the first elastic wire stop structure; the first elastic wire stop structure is disposed behind the elastic clip piece pressing structure.

With the above modification, when the push rod slides forward in relation to the connector body, the elastic clip piece pressing structure acts on elastic clip piece, causing the elastic clip piece presses down on the wire, thereafter, the first elastic wire stop structure cooperates with the second elastic wire stop structure to prevent the push rod from sliding backward in relation to the connector body. When need to slide back the push rod, work the push rod to allow the push rod to disengage from the first elastic wire stop structure and the second elastic wire stop structure, then slide the push rod backward.

DETAILED DESCRIPTION OF THE INVENTION

Figure 2:
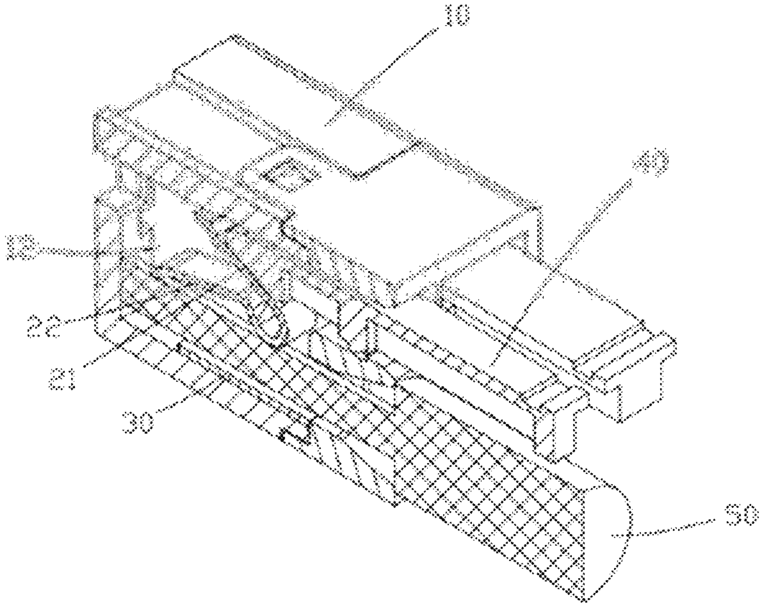
FIG. 2 is a cross-sectional view of FIG. 1.

As a first preferred embodiment, as shown in FIG. 2, a wire clip electrical connector comprises a connector body 10, an elastic clip piece 20 disposed in the connector body, an elastic conductive piece 30, and a push rod 40 slidably engaged with the connector body.

Figure 1:
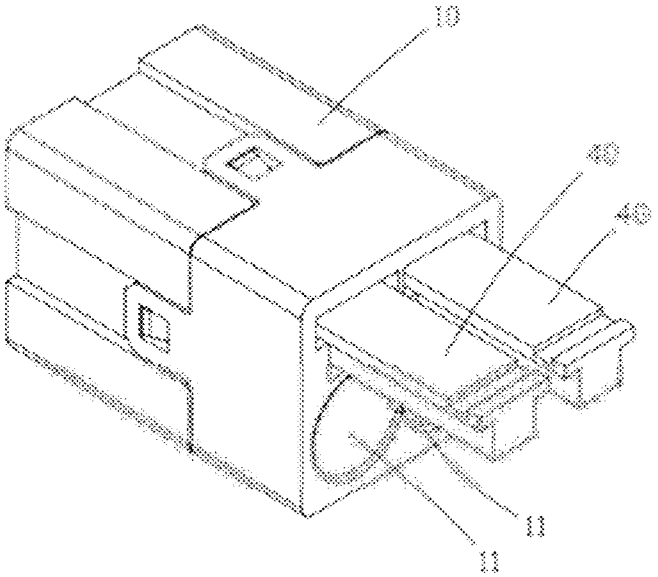
FIG. 1 is a schematic view of a first embodiment of a wire clip electrical connector.

In combination with FIG. 1 and FIG. 2, the connector body 10 is provided with a wire insertion hole 11 and a sliding cavity 12 connected to the wire insertion hole 11. As shown in FIG. 1, at least two wire insertion holes 11 are provided, wherein, at least two wires are inserted into the wire insertion holes 11 and are juxtaposed on the same side of the connector body 10.

Figure 3:
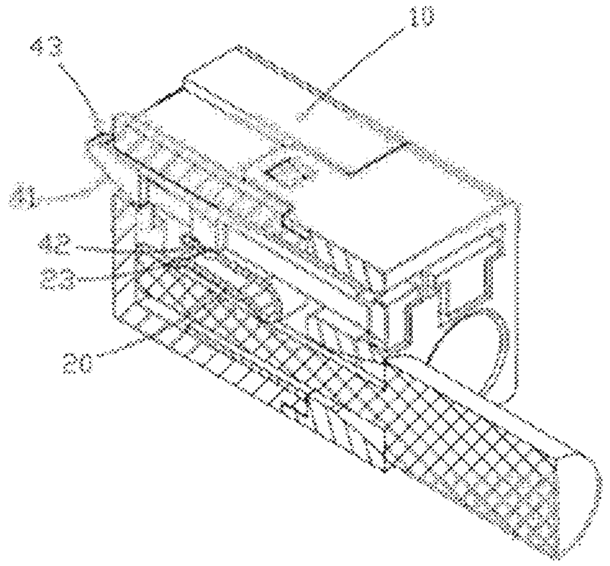
FIG. 3 is a schematic view of the push rod in FIG. 2 in a pushed forward position.
Figure 4:
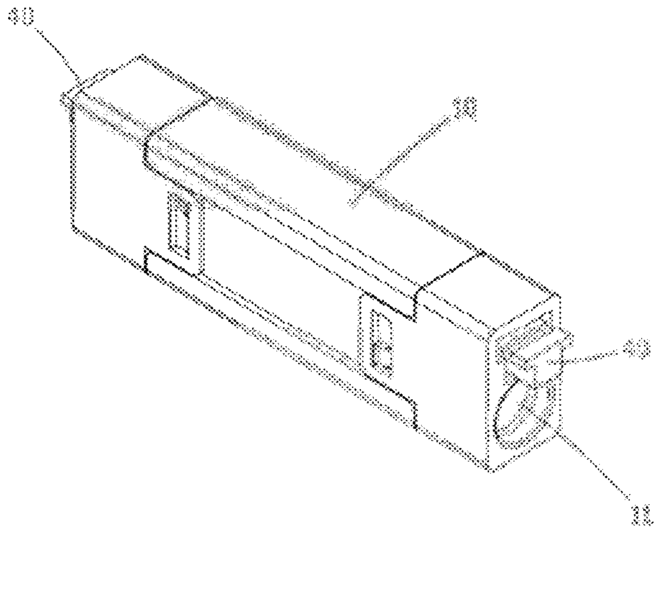
FIG. 4 is a schematic view of a second embodiment of a wire clip electrical connector.

As shown in FIG. 3, above the wire insertion hole 11 disposes a sliding slot, the push rod 40 is disposed in sliding slot, the push rod 40 is parallel to the wire insertion hole 11, the push rod 40 forward moving direction is the same as the inserting direction of a wire into the wire insertion hole 11.

As shown in FIG. 3, the push rod 40 is provided with an elastic clip piece pressing structure 41 and a first elastic wire stop structure 42. Preferably, the elastic clip piece pressing structure 41 is a wedge-shaped structure disposed at the front end of the push rod 40, and the first elastic wire stop structure 42 is a bump provided on the push rod 40. The bump is located behind the wedge structure.

As shown in FIG. 2, the elastic clip piece 20 and the elastic conductive piece 30 are respectively located above and below the wire insertion hole 11 for holding a wire inserted into the wire insertion hole 11. The elastic clip piece 20 is located in the cavity 12 of the connector body 10.

As shown in FIG. 2, the elastic clip piece 20 comprises an elastic piece upper portion 21 and an elastic piece lower portion 22. The upper portion and the lower portion of the elastic clip piece 20 are formed by bending a spring piece, and a rotating shaft is fitted at a bending portion of the spring piece, and the rotating shaft is fixedly disposed inside the connector body. 10. Wherein, the elastic clip piece lower portion 22 has an upward convex bending structure.

As shown in FIG. 3, the elastic clip piece upper portion 21 is provided with a second elastic wire stop structure 23 that cooperates with the first elastic wire stop structure. As a preferred embodiment, the second elastic wire stop structure 23 It is a groove provided on the upper portion 21 of the elastic piece.

In actual operation, referring to FIG. 2 and FIG. 3, the wire 50 is inserted into the wire insertion hole 11, and the push rod 40 is pushed forward, and the push rod is advanced along the chute, and the wedge structure at the front end thereof first acts on the clip. In the elastic piece upper portion 21 of the elastic clip piece 20, the elastic piece upper portion is forced to descend, forcing the elastic piece lower portion 22 to press the wire 50, and the wire is pressed against the elastic conductive piece 30. When the push rod 40 is moved forward to the extreme position, the bump thereon is engaged with the groove of the upper portion 21 of the elastic piece to function as a retraction. The push rod 40 is provided with a limiting structure that cooperates with the connector body 10 to limit the running range of the push rod in the sliding slot.

The front end of any push rod 40 is provided with a retraction point 43. When the line is to be retracted, the retraction point is pressed, and the protrusion on the push rod 40 and the groove on the elastic clip piece 20 are loosened, and then pulled back. The push rod 40, the elastic potential energy of the elastic clip piece is released, the wire 50 is no longer fastened, and the wire can be withdrawn from the wire insertion hole 11 to realize the retraction.

Second Embodiment

Figure 5:
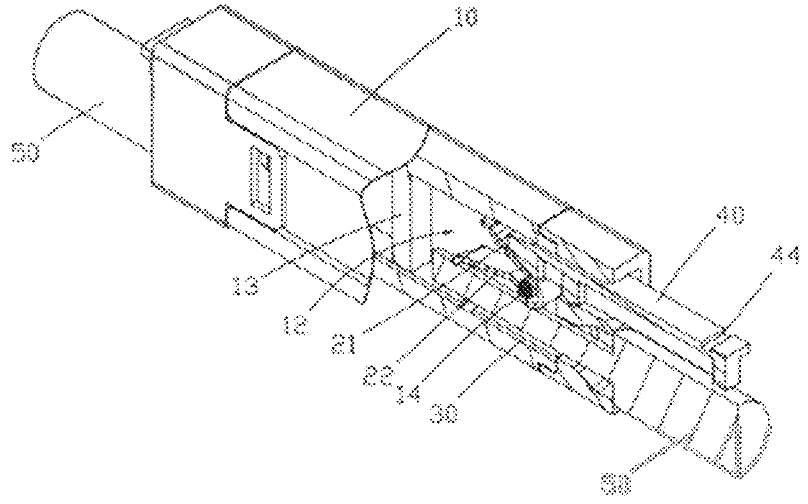
FIG. 5 is a cross-sectional view of FIG. 4.

As shown in FIG. 5, a clipped electrical connector includes a connector body 10, an elastic clip piece 20 disposed in the connector body, an elastic conductive piece 30, and a push rod 40 slidably engaged with the connector body. 4 and 5, the number of the wire insertion holes 11 is two or more, and two or more wire insertion holes are distributed on the front and rear sides of the connector body 10.

A sliding slot is disposed above any of the wire insertion holes 11, and a push rod 40 is engaged in any of the sliding grooves, and the push rod is parallel to the wire insertion hole 11, and the pushing direction of the push rod in the sliding groove is the same as that of the wire insertion hole. The direction in which the wire is inserted into the hole.

A cavity 12 is disposed between the wire insertion hole 11 and the sliding groove on the same side of the connector body 10, and the cavity communicates with the sliding groove and the wire insertion hole of the same side.

As shown in FIG. 5, a partition structure 13 is provided between the cavity on the front side of the connector body 10 and the cavity on the rear side of the connector body.

Figure 6:
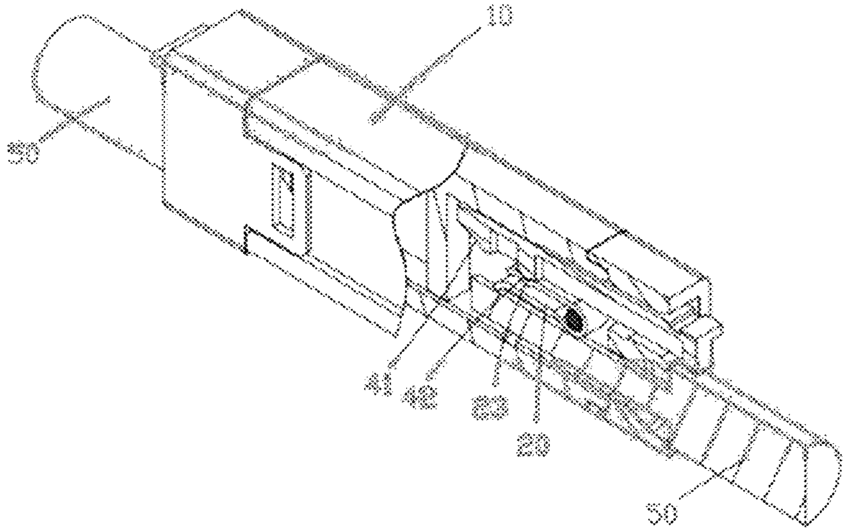
FIG. 6 is a schematic view of the push rod in FIG. 5 in a pushed forward position.

As shown in FIG. 6, the push rod 40 is provided with a spring pressing structure 41 and a first elastic wire stop structure 42. Preferably, the elastic piece pressing structure 41 is a wedge-shaped structure disposed at the front end of the push rod 40, and the first elastic wire stop structure 42 is a bump provided on the push rod 40.

As shown in FIG. 5, the elastic clip piece 20 and the elastic conductive piece 30 are respectively located above and below the wire insertion hole 11 for holding a wire inserted into the wire insertion hole.

As shown in FIG. 5, the elastic clip piece 20 includes an elastic piece upper portion 21 and an elastic piece lower portion 22. The elastic piece upper portion 21 and the elastic piece lower portion 22 are formed from bending an elastic piece, and a rotating shaft 14 is fitted at a bending portion of the elastic piece, and the rotating shaft is fixedly disposed at inside the connector body 10.

As shown in FIG. 6, the elastic piece upper portion 21 of the elastic piece is provided with a second elastic wire stop structure 23 that cooperates with the first elastic wire stop structure. As a preferred embodiment, the second elastic wire stop structure 23 It is a groove provided on the elastic piece upper portion 21 of the elastic piece. In actual operation, referring to FIG. 5 and FIG. 6, the wire 50 is inserted into the wire insertion hole 11 with the end portion abutting against the partition structure 13. The push rod 40 is pushed forward, and the push rod is advanced along the chute, and the wedge-shaped structure at the front end forces the elastic clip piece 20 to press the wire 50, and the wire is pressed against the elastic conductive piece 30. The push rod 40 is moved forward until it abuts against the partition structure 13, and the bump thereon is engaged with the groove of the upper portion 21 of the elastic piece to function as a retraction.

When the wire needs to be retracted, the retracting groove 44 at the end of the push rod 40 is pushed backward by the tool, the bump on the push rod 40 and the groove on the elastic clip piece 20 are loosened, and the push rod 40 is pushed back. The elastic potential energy of the elastic clip piece is released, the wire 50 is no longer fastened, and the wire can be withdrawn from the wire insertion hole 11 to realize the retraction.

The above content is only preferred embodiments of the present invention, and those skilled in the art will have any changes in the specific embodiments and application scope according to the idea of the present invention, and the contents of the present specification should not be understood to limit the invention.

What is claimed is:

1. A wire clip electrical connector comprising:

a connector body, an elastic clip piece disposed in the connector body, and an elastic conductive piece;

wherein the connector body defines a wire insertion hole, the elastic clip piece and the elastic conductive piece are located at two sides of the wire insertion hole for clamping the wire inserted into the wire insertion hole;

wherein the connector body is slidably fitted with a push rod, the push rod is provided with a spring pressing structure, under the action of the elastic pressing structure, the clamping elastic piece presses the wire in the direction of the elastic conductive piece;

wherein a number of the wire insertion holes is two or more;

wherein any one of the wire insertion holes is provided with a sliding slot, and any one of the sliding slots is matched with a push rod, the push rod is parallel with the wire insertion hole, and the pushing rod forward moving direction in the sliding slot is the same as the wire inserting direction in the wire insertion hole.

2. The wire clip electrical connector as claimed in claim 1, wherein the two or more wire insertion holes are juxtaposed on the same side of connector body.

3. The wire clip electrical connector as claimed in claim 1, wherein the two wire insertion holes are distributed before and after the connector body both sides.

4. The wire clip electrical connector as claimed in claim 2, wherein the elastic clip piece comprises an elastic piece upper portion and an elastic piece lower portion, and the elastic piece upper portion and the elastic piece upper portion are formed from bending an elastic piece; a bending shaft is matched with a bending portion of the elastic piece; a rotating shaft is fixedly disposed in the connector body, and the elastic piece upper portion is in contact with the elastic pressing structure of the pushing rod.

5. The wire clip electrical connector as claimed in claim 4, wherein said spring compression structure is a wedge-shaped structure disposed at the front end of the push rod.

6. The wire clip electrical connector as claimed in claim 5, wherein the push rod is provided with a first elastic wire stop structure, and the elastic piece upper portion is provided; wherein, there is provided a second elastic wire stop structure that cooperates with the first elastic wire stop structure; the first elastic wire stop structure is located behind the wedge structure.

7. The wire clip electrical connector as claimed in claim 6, wherein said first elastic wire stop structure is a bump disposed on the push rod, and said second elastic wire stop structure is a groove provided on the elastic piece upper portion.

8. The wire clip electrical connector as claimed in claim 3, wherein the elastic clip piece comprises an elastic piece upper portion and an elastic piece lower portion, and the elastic piece upper portion and the elastic piece upper portion are formed from bending an elastic piece; a bending shaft is matched with a bending portion of the elastic piece; a rotating shaft is fixedly disposed in the connector body, and the elastic piece upper portion is in contact with the elastic pressing structure of the pushing rod.

9. The wire clip electrical connector as claimed in claim 8, wherein said spring compression structure is a wedge-shaped structure disposed at the front end of the push rod.

10. The wire clip electrical connector as claimed in claim 9, wherein the push rod is provided with a first elastic wire stop structure, and the elastic piece upper portion is provided; wherein, there is provided a second elastic wire stop structure that cooperates with the first elastic wire stop structure; the first elastic wire stop structure is located behind the wedge structure.

11. The wire clip electrical connector as claimed in claim 10, wherein said first elastic wire stop structure is a bump disposed on the push rod, and said second elastic wire stop structure is a groove provided on the elastic piece upper portion.

* * * * *